US012803185B2

(12) United States Patent
Callies

(10) Patent No.: US 12,803,185 B2
(45) Date of Patent: Nov. 17, 2026

(54) SENSOR CONTACTING ELEMENT, CELL CONNECTOR TERMINAL AND CELL CONNECTOR PLATE

(71) Applicant: TE Connectivity Germany GmbH, Bensheim (DE)

(72) Inventor: Thorsten Callies, Bensheim (DE)

(73) Assignee: TE Connectivity Solutions GmbH, Schaffhausen (CH)

( * ) Notice: Subject to any disclaimer, the term of this patent is extended or adjusted under 35 U.S.C. 154(b) by 427 days.

(21) Appl. No.: 18/334,439

(22) Filed: Jun. 14, 2023

(65) Prior Publication Data

US 2023/0402769 A1 Dec. 14, 2023

(30) Foreign Application Priority Data

Jun. 14, 2022 (DE) ......................... 102022114957.9

(51) Int. Cl.

| | |
|---|---|
| ***H01R 4/18*** | (2006.01) |
| ***H01M 50/503*** | (2021.01) |
| ***H01R 13/05*** | (2006.01) |
| ***H01R 13/428*** | (2006.01) |

(52) U.S. Cl.

CPC .......... *H01R 4/184* (2013.01); *H01M 50/503* (2021.01); *H01R 13/052* (2013.01); *H01R 13/055* (2013.01); *H01R 13/428* (2013.01)

(58) Field of Classification Search

CPC .... H01R 4/184; H01R 13/052; H01R 13/055; H01R 13/428

USPC .......................................................... 439/877

See application file for complete search history.

(56) References Cited

U.S. PATENT DOCUMENTS 5,437,566 A 8/1995 Zinn et al.
5,664,972 A 9/1997 Zinn et al.
5,733,154 A * 3/1998 Libregts ................. H01R 4/182 439/850
7,887,368 B1 * 2/2011 Rossman ............. H01R 13/424 439/595
9,837,774 B2 12/2017 Kato
9,972,932 B2 5/2018 Copper et al.
10,014,614 B2 7/2018 Davies et al.
10,938,138 B2 3/2021 Lehmann et al.
11,050,125 B1 6/2021 Zhu et al.

(Continued)

FOREIGN PATENT DOCUMENTS

CN 109616807 A 4/2019
CN 209447908 U 9/2019

(Continued)

OTHER PUBLICATIONS

Extended European Search Report dated Nov. 9, 2023, corresponding to Application No. 23179238.3-1103, 9 pages.

(Continued)

*Primary Examiner* — Christopher M Koehler
*Assistant Examiner* — Gregory L Mangot
(74) *Attorney, Agent, or Firm* — Barley Snyder

(57) ABSTRACT

An electrical sensor contacting element includes a cell connector plate contact terminal for an electrical cable and a cell connector terminal at least partially complementary to the cell connector plate contact terminal. The cell connector terminal receives the cell connector plate contact terminal by plugging. The cell connector terminal is part of an electrical cell connector plate.

24 Claims, 3 Drawing Sheets

(56) References Cited

U.S. PATENT DOCUMENTS

| | | | | |
|---|---|---|---|---|
| 2002/0022414 | A1* | 2/2002 | Kitagawa | H01R 4/184 439/877 |
| 2011/0021085 | A1 | 1/2011 | Baughn et al. | |
| 2013/0098680 | A1 | 4/2013 | Nabeta et al. | |
| 2017/0125956 | A1 | 5/2017 | Kato | |
| 2018/0248280 | A1* | 8/2018 | Takahashi | H01M 50/503 |
| 2018/0366790 | A1 | 12/2018 | Saito et al. | |

FOREIGN PATENT DOCUMENTS

| | | | |
|---|---|---|---|
| CN | 111864441 | A | 10/2020 |
| EP | 0577927 | A1 | 1/1994 |
| JP | H737635 | A | 2/1995 |
| JP | 2017092030 | A | 5/2017 |
| JP | 2019008874 | A | 1/2019 |
| JP | 2020035588 | A | 3/2020 |
| KR | 1020090048503 | A | 5/2009 |
| KR | 1020130042546 | A | 4/2013 |
| WO | 2007126490 | A2 | 11/2007 |
| WO | 2017069209 | A | 4/2017 |
| WO | 2020154330 | A1 | 7/2020 |

OTHER PUBLICATIONS

Japanese Office Action dated Dec. 27, 2024 with English translation, corresponding to Application No. 2023-096058, 7 pages.

Japanese Notice of Reasons for Refusal dated Jul. 9, 2024 with English translation, corresponding to Application No. 2023-096058, 15 pages.

Korean Office Action dated Oct. 24, 2024 with English translation, corresponding to Application No. 10-2023-0075502, 25 pages.

Indian Examination Report dated Sep. 9, 2025, corresponding to Application No. 202344039571, 7 pages.

Chinese Office Action dated Aug. 22, 2026, corresponding to Application No. 202310693171.6, 8 pages.

* cited by examiner

SENSOR CONTACTING ELEMENT, CELL CONNECTOR TERMINAL AND CELL CONNECTOR PLATE

CROSS-REFERENCE TO RELATED APPLICATIONS

This application claims the benefit of the filing date under 35 U.S.C. § 119(a)-(d) of German Patent Application No. 102022114957.9, filed on Jun. 14, 2022.

FIELD OF THE INVENTION

The invention relates to an electrical sensor contacting element of a cell connector plate. The invention also relates to an electrical cell connector plate contact terminal. The invention furthermore relates to an electrical cell connector plate and an electrical entity.

BACKGROUND

Wiring harnesses for sensor monitoring of batteries are often fixed to the cell connector plates of the batteries by ultrasonic welding (copper inner conductors of the cables welded to the cell connector plates made of aluminum). This technology is fraught with a certain degree of unmanageability. There is a need for an alternative to ultrasonic welding of wire harnesses to cell connector plates of batteries.

SUMMARY

An electrical sensor contacting element includes a cell connector plate contact terminal for an electrical cable and a cell connector terminal at least partially complementary to the cell connector plate contact terminal. The cell connector terminal receives the cell connector plate contact terminal by plugging. The cell connector terminal is part of an electrical cell connector plate.

BRIEF DESCRIPTION OF THE DRAWINGS

Exemplary embodiments of the invention are described by way of the following drawings. In the drawings.

DETAILED DESCRIPTION OF THE EMBODIMENT(S)

Figure 2:
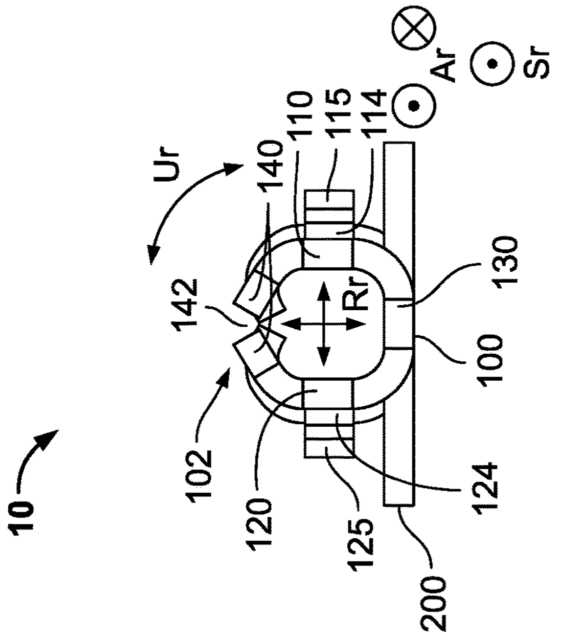
FIG. 2 is an end view of the electrical cell connector plate contact terminal.

The invention is explained in greater detail below on the basis of exemplary embodiments with reference to the appended schematic drawings, which are not to scale. Sections, elements, component parts, units, components and/or patterns which have an identical, unique or analogous configuration and/or function are identified by the same reference symbols. A possible alternative which is not explained, is not illustrated in the drawings and/or is not definitive, a static and/or kinematic reversal, a combination etc. with respect to the exemplary embodiments of the invention or a component, a pattern, a unit, a component part, an element or a section thereof, can further be gleaned from the figures.

In the case of the invention, a feature (section, element, component part, unit, component, function, variable etc.) can be of positive configuration, that is to say present, or of negative configuration, that is to say absent. In this specification, a negative feature is not explained explicitly as a feature if value is not placed on it being absent according to the invention. That is to say, the invention which is actually made and is not constructed by way of the prior art consists in omitting the said feature.

A feature of this specification can be used not only in a specified manner and/or way, but rather also in another manner and/or way (isolation, combination, replacement, addition, on its own, omission, etc.). In particular, it is possible to replace, add or omit a feature in the patent claims and/or the description on the basis of a reference symbol and a feature which is assigned to it, or vice versa.

The features of the description can also be interpreted as optional features; that is to say a feature which is not mandatory. Therefore, a separation of a feature, possibly including its periphery, from an exemplary embodiment is possible, it then being possible for the said feature to be transferred to a generalized inventive concept. The absence of a feature (negative feature) in an exemplary embodiment shows that the feature is optional in relation to the invention. In addition, in the case of a type term for a feature, a generic term for the feature can also be implicitly understood (possibly further hierarchical breakdown into subgenus, etc.), as a result of which a generalization of the feature is possible, for example with consideration of equivalent effect and/or equivalence.

The invention is explained in greater detail below with reference to exemplary forms of an embodiment of a variant of an electrical cell connector plate contact terminal 10 (in particular, FIGS. 1 to 4) for an electrical cable 40, for electrically contacting an electrical cell connector plate 50, and with reference to exemplary forms of an embodiment of a variant of an electrical cell connector plate 50 having a cell connector terminal 510 (FIGS. 5 and 6), in each case for a battery 0, in particular a traction battery 0 of an electric vehicle.

An electrical sensor contact element according to the invention includes two parts: the cell connector plate contact terminal 10 and the cell connector terminal 510 that receives the cell connector plate contact terminal 10 in a plugging manner. The cell connector plate contact terminal 10 may also be referred to as a contact terminal 10 herein.

The cell connector plate contact terminal 10 can be formed as a pin terminal, a tab terminal or a socket terminal. Accordingly, the cell connector terminal 10 can be formed as a socket terminal, a tab terminal or a pin terminal. The cell connector plate contact terminal 10 and the cell connector terminal 510 can be made of the same material, in particular aluminum, with the cable 40 possibly being a copper cable. This eliminates the need for a difficult process for welding copper to aluminum.

The invention can be used in general in the electrical sector in the case of an electrical entity, such as an assembled electrical cable or battery for a vehicle. The exception to this is ground-based electrical power engineering (except, of course, for voltage taps, for example for sensor applications or the like). Moreover, although the invention is described and illustrated further in greater detail by way of exemplary embodiments, the invention is not restricted by the disclosed exemplary embodiments, but rather is of more fundamental nature. Other variations can be derived therefrom without departing from the scope of protection of the invention.

The drawings show only those physical sections of a subject matter of the invention which are necessary for understanding the invention. Designations such as connector and mating connector, terminal and mating terminal etc. are to be interpreted synonymously, that is to say may be mutually interchangeable. In the following, the explanation of the invention with reference to the drawing refers to an axial direction Ar (one choice of which is the plugging direction Sr), a radial direction Rr and a circumferential direction Ur of the cell connector plate contact terminal 10 and the cell connector terminal 510.

FIGS. 1 to 4 show the cell connector plate contact terminal 10 having three portions 100, 200, 300: a contact portion 100, a transition portion 200, and a connection portion 300, which are integrally formed with each other and are arranged one after the other in the axial direction Ar. The connection portion 300 serves for electrically connecting the cable 40 and is formed as a wire crimping portion and does not have an insulation crimping portion, but in another embodiment may have one. The transition portion 200 between the connection portion 300 and the contact portion 100 is formed in the present case for connecting the cell connector plate contact terminal 10 to a reel. In embodiments, the cell connector plate contact terminal 10 is formed free of an insulation crimping portion.

The cell connector plate contact terminal 10, which is formed as a crimp terminal 10, is bent together from a single material layer and is thereby given a substantially socket-like form overall. In this case, the cell connector plate contact terminal 10 may be formed substantially in a single layer on substantially all sides. That is to say, there is no side and/or substantially no portion of the cell connector plate contact terminal 10 at which it is formed in a double-layer or multiple-layer configuration by its constituent material layer. That is to say, the cell connector plate contact terminal 10 has a single structure.

The contact portion 100 serves for electrically contacting the cell connector terminal 510. The contact portion 100 makes the cell connector plate contact terminal 10 a male terminal, with the contact portion 100 being formed as a socket-like contact box which is hollow on the inside. The male contact portion 100 or the contact box has a surface on its outer periphery for electrically contacting the cell connector terminal 510 (see FIG. 6) and is formed at least in portions as a radial spring 102; 110, 130, 120. In an embodiment, substantially the entire contact portion 100 in the axial direction Ar is formed as an elongate radial spring 102; 110, 130, 120. Another configuration of the cell connector plate contact terminal 10, such as a socket terminal or tab terminal, is of course applicable.

A wall thickness of the cell connector plate contact terminal 10 may be about 25%, about 30%, about 40%, about 50%, about 60%, about 70%, or about 75% of the wall thickness of the cell connector terminal 510. In other words, the cell connector plate contact terminal 10 may be comparatively soft or flexible compared to the cell connector terminal 510. In particular, the cell connector plate contact terminal 10 can be formed as a socket-like pin terminal and the cell connector terminal 510 as a socket terminal.

The cell connector plate contact terminal 10 can be formed bent together in a single layer. The socket-like pin terminal as a male terminal in the present case thus has the spring properties of the sensor contacting element, whereas the cell connector terminal 510 is comparatively stiff compared to the cell connector plate contact terminal 10. The cell connector terminal 510 can be bent out of a material layer of the cell connector plate. In this case, the cell connector terminal 510 can protrude from the connector main body in the form of a splinter, the splinter-like cell connector terminal of course not being raised from the connector main body, but still being connected to it, for example integrally.

A cross-section of the radial spring 102; 110, 130, 120 can be seen clearly in FIG. 2. The radial spring 102; 110, 130, 120 comprises two spring legs 110, 120 that are resilient with respect to each other in the radial direction Rr. Starting from their rest position, the two spring legs 110, 120 can be pushed together or are compressible radially Rr, allowing the contact portion 100 to be plugged into the cell connector terminal 510. In the plugged-in state of the contact portion 100, the spring legs 110, 120 spring open in the radial direction Rr and thus press an outer side of the contact portion 100 against an inner side of the cell connector terminal 510 (see FIG. 6).

In the embodiment shown, the contact portion 110 comprises, starting from a bottom wall 130, on the one hand (on the right in FIG. 2), a first side wall 110 and, on the other hand (left in FIG. 2), a second side wall 120, the side walls 110, 120 being bent towards one another at their free, i.e. upper ends. These regions of the side walls 110, 120 which are bent towards each other form a slotted (spring slot 142) ceiling 140 of the contact portion 100. This gives the contact portion 110 an O-shaped slotted cross-section. Other cross sections such as elliptical, polygonal, U-shaped, V-shaped, etc. are of course applicable.

Here, the O-shaped cross-section of the contact portion 110 can be formed in particular as follows. The bottom wall 130 and the two side walls 110, 120 each have a rectilinear portion. The respective rectilinear portions of the side walls 110, 120 each form a rounded corner region with the base wall 130. Similarly, the side walls 110, 120 opposite the bottom wall 130 may also have rounded corner regions at which there are short rectilinear portions between which there is formed the spring slot 142 of the ceiling 140 of the contact portion 100.

The first side wall 110, the bottom wall 130, and the second side wall 120 here form the radial spring 102; 110, 130, 120 in the contact portion 110 or as the contact portion 110. The spring slot 142 in the top 140, which divides it into two portions, allows the radial spring 102; 110, 130, 120 to function, on the one hand, and can be dimensioned, on the other hand, such that it cannot be overly compressed radially Rr. Instead of the radial spring 102; 110, 130, 120, the contact portion 100, or a portion of the contact portion 100, can be formed as a functionally similar leg spring or a functionally similar leaf spring, or the radial spring 102; 110, 130, 120 can be formed as such a spring. The leg spring of the cell connector plate contact terminal 10, that is to say a spring portion that can be sprung in a radial direction of the cell connector plate contact terminal 10 in the axial direction of the cell connector plate contact terminal 10, takes up a torque at its legs (plugging into cell connector terminal 510) starting from its rest position during an angular and/or rotational movement, which it releases again during relaxation.

The spring legs of the leg spring can be mechanically coupled to each other only via a simple connection. In other words, the leg spring does not have a complete winding and can therefore also be referred to or formed as a leaf spring. For example, the two side walls 110, 120 of the contact portion as the legs of the leg spring are mechanically coupled only via a simple bottom wall 130 of the contact portion as a simple connection. In the cross-section (radial plane) of the leg spring, the free leg ends of the spring legs can be bent towards each other.

Figure 1:
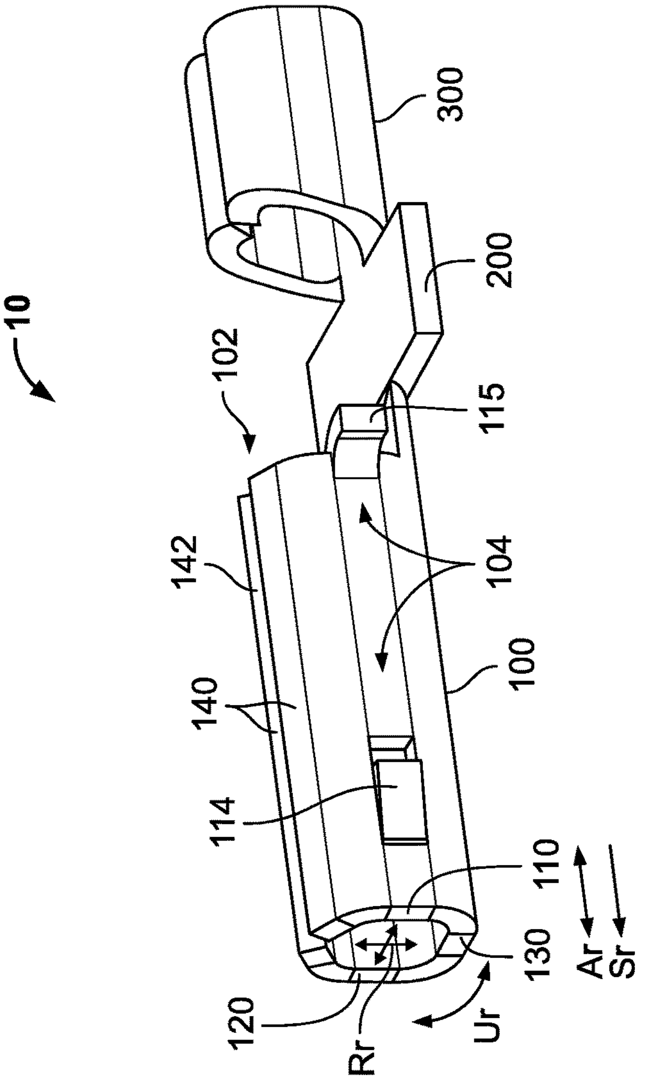
FIG. 1 is a perspective view of an electrical cell connector plate contact terminal.
Figure 4:
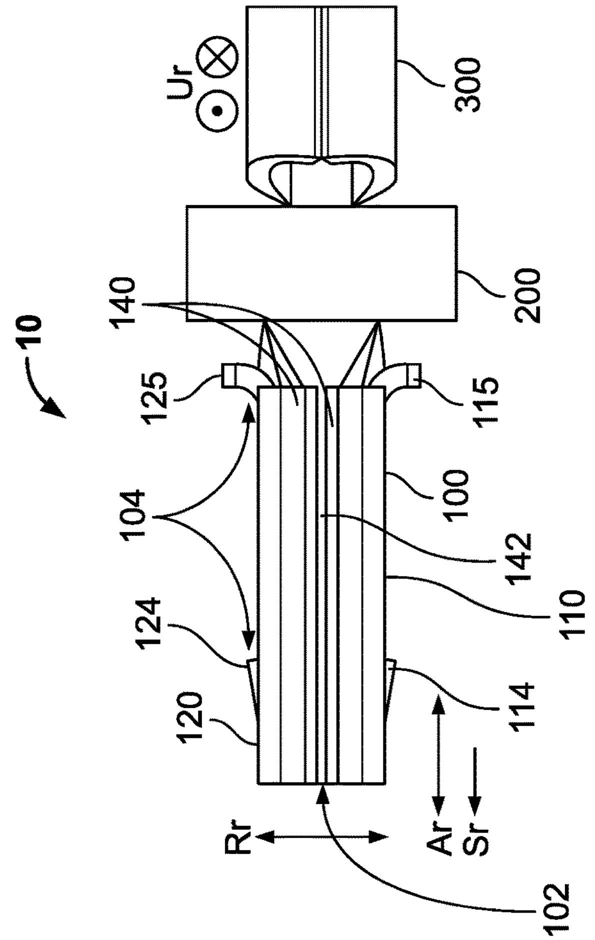
FIG. 4 is a top view of the electrical cell connector plate contact terminal.
Figure 3:
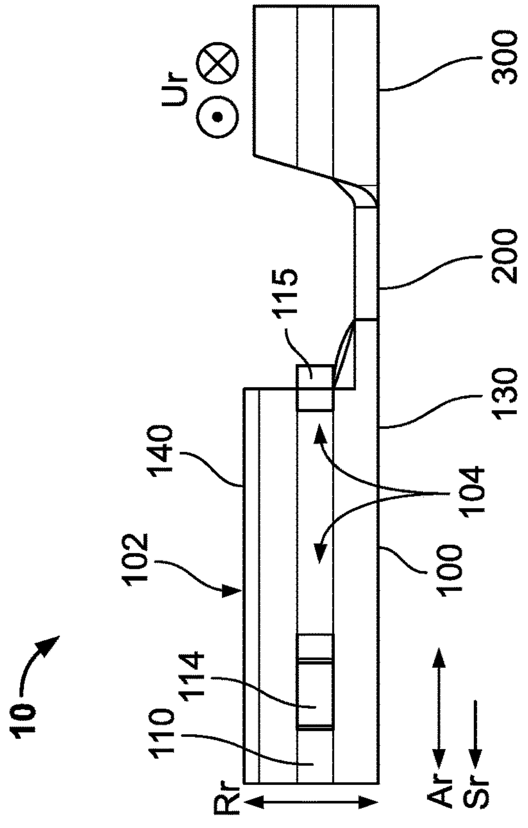
FIG. 3 is a side view of the electrical cell connector plate contact terminal.

A cell connector terminal receptacle 104, shown in FIGS. 1, 3, and 4, can be formed externally on the contact portion 100, in particular externally on a side wall 110, 120. The cell connector terminal receptacle 104 serves to fix the contact portion 100 in the cell connector terminal 510, or vice versa. For this purpose, the cell connector terminal receptacle 104 has, on the one hand, at the front of the contact portion 100, a radially Rr spring-loadable error element 114, 124, and, on the other hand, at the rear of the contact portion 100, a possibly axially Ar spring-loadable axial stop 115, 125. Here, the cell connector terminal receptacle 104 is formed in the axial direction Rr between the spring element 114, 124 and the axial stop 115, 125. That is to say, the receptacle 104 is accessible radially Rr from outside the contact portion 100. In an embodiment, the respective spring element 114, 124 extends in the axial direction Ar and protrudes somewhat radially from the respective side wall 110, 120 (about 25% to about 150% of a thickness of the material layer of the cell connector plate contact terminal 10).

The spring element 114, 124 is cut out of or released from a wall 110, 120, 130 of the contact portion 100 ((die) stamping and bending process) and protrudes somewhat radially from the wall 110, 120, 130, analogously to a locking lance. The axial stop 115, 125 may be formed as a tab which projects radially away from the contact portion 100 at one end thereof. Alternatively, the axial stop 115, 125 can be formed analogously to the spring element 114, 124 and/or the spring element 114, 124 can be formed analogously to the axial stop 115, 125. In an embodiment, the contact portion 110 has two cell connector terminal receptacles 104, 104 opposite each other at the side walls 110, 120.

The contact portion 100, the contact box and/or the elongate radial spring can have exactly or at least one axial stop 115, 125, or can have exactly or at least two radially substantially opposite axial stops. In an embodiment, the respective axial stop 115, 125 extends in a radial direction Rr and protrudes radially from the respective side wall 110, 120 (about 100% to about 300% of a thickness of the material layer of the cell connector plate contact terminal 10). In this regard, a respective axial stop 115, 125 may itself be designed to be resilient in the axial direction Ar. A radial resilience of the respective axial stop 115, 125 in question is provided, for example, by the provision on the elongate radial spring 102; 110, 120, 130.

Figure 5:
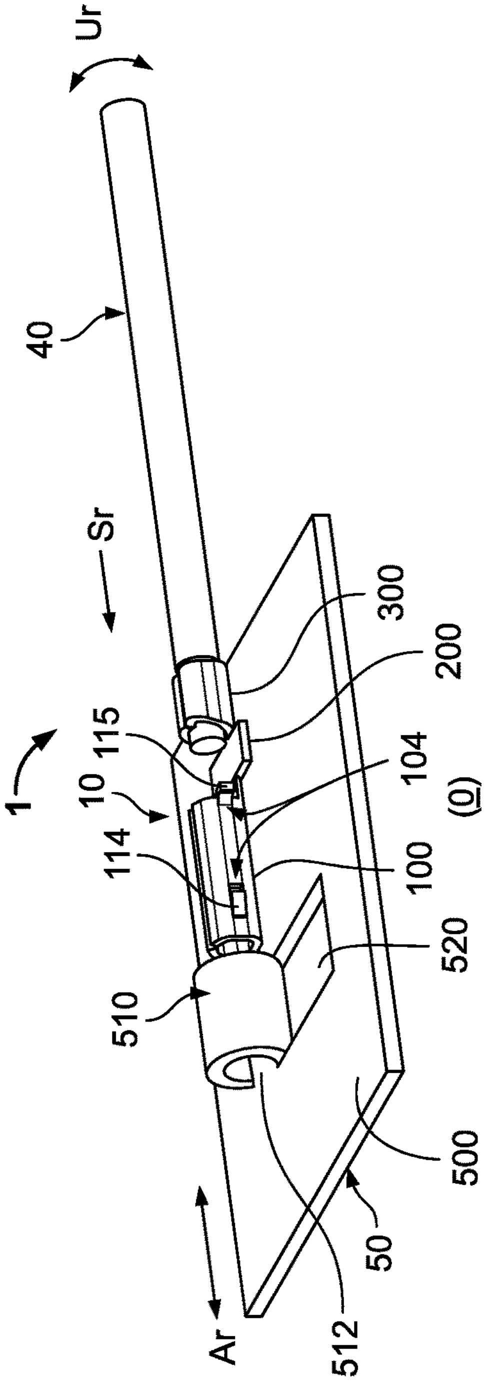
FIG. 5 is a perspective view of an electrical sensor contacting element of an electrical cell connector plate formed of the cell connector plate contact terminal and a cell connector terminal partially complementary thereto, in a state substantially immediately prior to plugging together.
Figure 6:
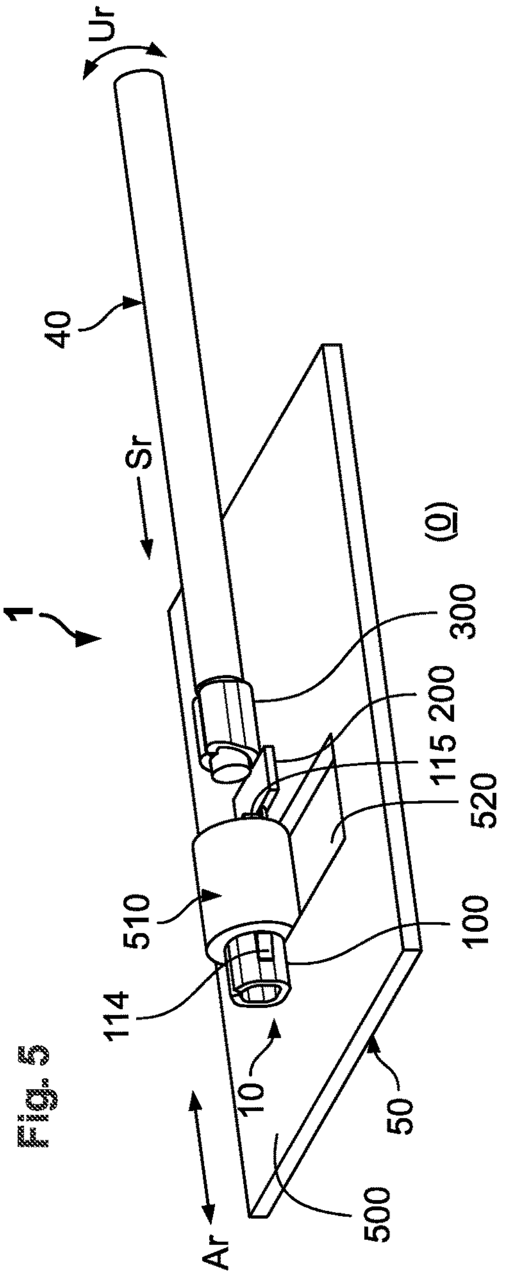
FIG. 6 is a perspective view of the electrical sensor contacting element and the cell connector terminal partially complementary thereto in a plugged-together state.

FIGS. 5 and 6 show, in addition to the cell connector plate 50, a (pre-)assembled electrical cable 1. Here, the (pre-) assembled cable 1 comprises the cell connector plate contact terminal 10 and also the cable 40 electrically connected thereto. In this case, the cable 40 is attached by its solid conductor, its sector-pressed or compacted conductor or its stranded conductor to the connection portion 300, for example is crimped to the latter. Another technology, such as soldering welding, or adhesive bonding for attaching the conductor to the connection portion 300 is of course applicable.

FIGS. 5 and 6 show the cell connector terminal 510 provided on a connector main body 500 of the cell connector plate 50. In particular, the cell connector terminal 510 is formed as a bushing terminal 510 and may be integrally formed with the connector main body 500. The terminal 510 is cut free from the connector main body 500 on three sides and is rolled or bent out of the plane of the connector main body 500, so that the cell connector terminal 510 protrudes from the connector main body 500 as a sleeve 510 or a roll 510. This leaves a recess 520, particularly a through-recess 500, in the connector main body 500. Another configuration of the cell connector terminal 510, such as a pin or tab terminal, is of course applicable.

In embodiments, the cell connector terminal 510 can be formed as a socket terminal having a substantially elliptical or polygonal inner cross-section and/or outer cross-section. An elliptical inner cross-section and/or outer cross-section is in this case a circular inner cross-section and/or outer cross-section. A polygonal inner cross-section and/or outer cross-section is in this case a square or rectangular inner cross-section and/or outer cross-section.

The cell connector terminal 510 has a notionally simple structure here and is constituted from a merely round-bent, smooth material layer. A free end of a tab bent to form the cell connector terminal 510 may be seated here on the connector main body 500 or may be arranged in the cell connector plate 50 with a slot 512 spaced therefrom. In the first case, the free end of the cell connector terminal 510 can be fixedly connected to the connector main body 500, for example, welded, soldered or adhesively bonded.

The cell connector terminal 510 can be formed as a sleeve or a roll, which is open at both axial end faces. In this case, the cell connector terminal 510 can be formed in such a way that the cell connector plate contact terminal 10 can be inserted into the sleeve or roll coming from both end faces; this is of course also applicable to other embodiments. The cell connector terminal 10 can be slotted at a circumference, with a slot extending in the axial direction Ar along a complete extension of the cell connector terminal 10. Alternatively, it is possible to fix a free circumferential end of the cell connector terminal 10 to the connector main body, for example by a weld spot.

The cell connector plate 50 can have welding areas as electrical contact devices for the battery terminals, measuring recesses for the battery terminals, electrical power contact devices, mechanical and possibly thermal bridging areas (beads), etc.

FIGS. 5 to 6 show the (pre-)assembled cable 1 when the cell connector plate contact terminal 10 is plugged into the cell connector terminal 510. When the cell connector plate contact terminal 10 is plugged into the cell connector terminal 510, the radial spring 102; 110, 130, 120 of the contact portion 100 is radially compressed and the contact portion 100 thereupon slides into the socket-like cell connector terminal 510, its front end passing through the entire cell connector plate contact terminal 510. At this point, the spring elements 114, 124 are fully plugged through the terminal 510. Plugging the cell connector plate contact terminal 10 into the cell connector terminal 510 can be facilitated by insertion chamfers on a free end face of the contact portion 100.

In a plugged-together state of the cell connector plate contact terminal 10 with the cell connector terminal 510 (see FIG. 6), the cell connector terminal 510 has been seated in the cell connector terminal receptacles 104, 104 of the contact portion 100. Here, one end face of the cell connector terminal 510 rests against the spring elements 114, 124 projecting radially Rr from the contact portion 100. An end face of the cell connector terminal 510 opposite this end face axially Ar sits here against the axial stops 115, 125 protruding radially Rr from the contact portion 100.

The cell connector plate contact terminal 510 or the cell connector plate 50 can be provided in one piece, materially in one piece, or can be integrally formed with its cell connector terminal. A one-piece design is understood to be a design of the cell connector plate contact terminal 510 or of the cell connector plate 50 with its cell connector terminal, in which its individual parts are fixed to one another in a non-positively and/or positively-locking manner and can be separated again into its individual parts without damage. In the case of a multi-part design, a non-positively and/or positively locking connection would (necessarily) be absent or a bond would be established by a third part.

A materially (adhesively) one-piece design is understood to be a design of the cell connector plate contact terminal 10 or of the cell connector plate 50 with its cell connector terminal in which its individual parts are fixed to each other in a materially bonded manner (by welding, soldering, adhesive bonding, etc.) and cannot be separated into its individual parts without damage. In this case, the bond can further be produced by a non-positively and/or positively locking connection (not in the case of an integral design).

An integral design is understood to mean a design in which there is only one single component part, which can be separated only by being destroyed. The component is manufactured from a single original piece (metal sheet, blank, etc.) and/or from a single original mass (molten metal), which in turn is inevitably integral. An internal bond is performed by means of adhesion and/or cohesion. In all embodiments, a coating, deposition, electroplating, etc. may additionally be present.

The cell connector plate contact terminal 510 or the cell connector terminal 10 may be formed substantially entirely merely as a single layer. Further, the cell connector plate contact terminal 510 or the cell connector terminal 10 may not be formed as a power terminal for a battery electric current. That is to say, the cell connector plate contact terminal 510 and/or the cell connector terminal 10 is or are formed as a voltage tap, in particular for a sensor application.

An electrical connector according to the invention has at least one cell connector terminal 510 according to the invention or a cell connector plate 50 according to the invention and a housing, in particular a housing made of plastic. An electrical plug connection according to the invention comprises at least one cell connector terminal 510, according to the invention where applicable, and a cell connector plate 50, according to the invention where applicable. The entity according to the invention comprises at least one component and a cell connector plate contact terminal 10 according to the invention and/or a cell connector plate 50 according to the invention.

Such an entity according to the invention is formed, for example, as an electrical component, an assembled electrical cable, an electrical module, an electrical device, a battery (accumulator), an electrical apparatus, an electrical unit, etc. In this regard, the entity may of course comprise a connector according to the invention and/or a plug connection according to the invention. A (pre-)assembled cable (entity) according to the invention in this case has, in particular, an electrical cable (component), where applicable a connector housing (component) and a cell connector terminal according to the invention. In particular, a battery (entity) according to the invention comprises at least one battery module (component), where applicable a battery housing (component) and a cell connector plate according to the invention.

A vehicle—in particular a motor vehicle (road vehicle), but also: a rail vehicle, watercraft and/or aircraft—with an electric traction motor is understood to be a motor vehicle which, in addition to its electric traction motor, can have a further non-electric drive, such as an internal combustion engine. In other words, a vehicle with an electric traction motor can be understood to mean, for example, a hybrid electric vehicle, an electric vehicle (electric motor drive only), a fuel cell vehicle, etc.

What is claimed is:

1. An electrical sensor contacting element, comprising:

a cell connector plate contact terminal for an electrical cable, the cell connector plate contact terminal has an elongated radial spring; and a cell connector terminal at least partially complementary to the cell connector plate contact terminal, the cell connector terminal has a slot extending in an axial direction, the cell connector plate contact terminal is plugged into the slot, the cell connector terminal is part of an electrical cell connector plate.

2. The electrical sensor contacting element of claim 1, wherein the cell connector plate contact terminal has a contact portion contacting the cell connector terminal and a connection portion connected to the electrical cable.

3. The electrical sensor contacting element of claim 1, wherein a wall thickness of the cell connector plate contact terminal is about 25-75% of a wall thickness of the cell connector terminal, the cell connector plate contact terminal is a socket-like pin terminal and the cell connector terminal is a socket terminal.

4. The electrical sensor contacting element of claim 1, wherein the cell connector plate contact terminal is bent as a single layer.

5. The electrical sensor contacting element of claim 1, wherein the cell connector terminal is bent out of a material layer of the electrical cell connector plate.

6. The electrical sensor contacting element of claim 1, wherein the cell connector plate contact terminal includes a radially resilient spring element and an axial stop opposite the radially resilient spring element.

7. An electrical cell connector plate contact terminal, comprising:

a contact portion that is formed as a male terminal bent together from a material layer in a circumferential direction to form a radial spring; and a terminal portion connectable to an electrical cable, the contact portion and the terminal portion extend in an axial direction, the radial spring is elongated in the axial direction, the contact portion has an axial stop extending away from the contact portion in a radial direction, the radial direction is perpendicular to the axial direction.

8. The electrical cell connector plate contact terminal of claim 7, wherein the radial spring has a substantially O-shaped slotted, U-shaped or V-shaped cross-section.

9. The electrical cell connector plate contact terminal of claim 7, wherein the radial spring is formed as a leg spring with a pair of spring legs in a radial plane, the spring legs are connected to one another only by a bottom wall.

10. The electrical cell connector plate contact terminal of claim 7, wherein the contact portion is formed substantially as a contact box of which an electrical contact surface is arranged on an outer periphery of the contact box, the contact portion has a pair of side walls connected by a bottom wall and an open top wall, the contact box has a substantially rectangular cross-section with rounded corner regions or a substantially elliptical cross-section.

11. The electrical cell connector plate contact terminal of claim 7, wherein the contact portion has a radially resilient spring element.

12. The electrical cell connector plate contact terminal of claim 7, further comprising a transition portion between the contact portion and the connection portion.

13. The electrical cell connector plate contact terminal of claim 7, wherein the contact portion and the terminal portion are formed in one piece.

14. An electrical entity, comprising:

a cell connector plate contact terminal as claimed in claim 7.

15. The electrical cell connector plate contact terminal of claim 7, wherein the contact portion has a cell connector terminal receptacle at an outer side receiving a cell connector terminal of a cell connector plate.

16. The electrical cell connector plate contact terminal of claim 15, wherein the cell connector terminal receptacle includes a radially resilient spring element.

17. An electrical cell connector plate, comprising:

a plate-shaped connector main body electrically connecting a plurality of battery cells of a battery; and a cell connector terminal, the cell connector terminal is cut free from the plate-shaped connector main body, bent out of a plane of the plate-shaped connector main body, and disposed on the plate-shaped connector main body.

18. The electrical cell connector plate of claim 17, wherein the cell connector terminal is:

electrically connected to the plate-shaped connector main body on at least one side; and/or formed as a socket terminal having a substantially elliptical or polygonal cross-section.

19. The electrical cell connector plate of claim 17, wherein the cell connector terminal:

is formed as a sleeve or a roll that is open at a pair of axial end faces;

has a slot extending in an axial direction along a full extent of the cell connector terminal; and/or is formed of the plate-shaped connector main body by at least one bent-over tab.

20. The electrical cell connector plate of claim 17, wherein cell connector terminal is formed in one piece with the plate-shaped connector main body and is formed in a single layer.

21. The electrical cell connector plate of claim 17, wherein the cell connector terminal is formed as a roll.

22. The electrical cell connector plate of claim 17, wherein the cell connector terminal has a slot extending in an axial direction along a full extent of the cell connector terminal, the slot is defined by both the cell connector terminal and the plate-shaped connector main body.

23. The electrical cell connector plate of claim 17, wherein one end of the cell connector terminal is disposed on the plate-shaped connector main body and an other end of the cell connector terminal is integral with the plate-shaped connector main body.

24. The electrical cell connector plate of claim 17, further comprising a recess defined by the plate-shaped connector main body, the cell connector terminal abuts the recess.

* * * * *